United States Patent
Remondi

(10) Patent No.: US 7,737,888 B2
(45) Date of Patent: Jun. 15, 2010

(54) CONVEYING ORBIT INFORMATION VIA AMBIGUOUS POSITION INFORMATION

(75) Inventor: Benjamin William Remondi, Dickerson, MD (US)

(73) Assignee: Trimble Navigation Limited, Sunnyvale, CA (US)

( * ) Notice: Subject to any disclaimer, the term of this patent is extended or adjusted under 35 U.S.C. 154(b) by 321 days.

(21) Appl. No.: 12/008,893

(22) Filed: Jan. 14, 2008

(65) Prior Publication Data

US 2009/0179792 A1  Jul. 16, 2009

(51) Int. Cl.
  *G01S 1/00* (2006.01)
(52) U.S. Cl. .............................. 342/357.09; 342/357.02
(58) Field of Classification Search ............ 342/357.09, 342/357.02
  See application file for complete search history.

(56) References Cited

U.S. PATENT DOCUMENTS

| | | | |
|---|---|---|---|
| 6,016,117 A | 1/2000 | Nelson, Jr. | |
| 6,243,648 B1 | 6/2001 | Kilfeather et al. | |
| 6,453,237 B1 | 9/2002 | Fuchs et al. | |
| 6,480,788 B2 | 11/2002 | Kilfeather et al. | |
| 6,560,536 B1 | 5/2003 | Sullivan et al. | |
| 6,651,000 B2 | 11/2003 | van Diggelen et al. | |
| 6,725,158 B1 | 4/2004 | Sullivan et al. | |
| 7,725,158 | 4/2004 | Sullivan et al. | |
| 6,829,535 B2 | 12/2004 | van Diggelen et al. | |
| 7,095,368 B1 | 8/2006 | van Diggelen | |
| 7,095,370 B1 | 8/2006 | van Diggelen et al. | |
| 7,158,883 B2 | 1/2007 | Fuchs et al. | |
| 7,298,319 B2 * | 11/2007 | Han et al. | 342/357.02 |
| 7,548,200 B2 | 6/2009 | Garin et al. | |
| 7,548,816 B2 | 6/2009 | Riben et al. | |

* cited by examiner

*Primary Examiner*—Thomas H Tarcza
*Assistant Examiner*—Harry Liu

(57) ABSTRACT

In a method of conveying information regarding an orbit used at a Global Navigation Satellite System (GNSS) base station to a GNSS receiver, a satellite position is determined for a particular time from an orbit of a GNSS satellite. An ambiguity value is extracted from the satellite position. The ambiguity value is extracted based upon a satellite position determination margin of error of a GNSS receiver. The ambiguity value is encoded into an encoded ambiguity value which is assembled into a message. The message also includes a time tag representing the particular time. The message is transmitted from the GNSS base station. The encoded ambiguity value and the time tag convey information regarding the orbit to a GNSS receiver in receipt of the message.

25 Claims, 7 Drawing Sheets

300

```
┌─────────────────────────────────────────────────────────────────┐
│ DETERMINING A SATELLITE POSITION FOR A PARTICULAR TIME FROM AN  │
│                   ORBIT OF A GNSS SATELLITE.                    │
│                              310                                │
└─────────────────────────────────────────────────────────────────┘
                                │
                                ▼
┌─────────────────────────────────────────────────────────────────┐
│ EXTRACTING AN AMBIGUITY VALUE FROM THE SATELLITE POSITION, THE  │
│ EXTRACTING BASED UPON A SATELLITE POSITION DETERMINATION MARGIN │
│                   OF ERROR OF A GNSS RECEIVER.                  │
│                              320                                │
└─────────────────────────────────────────────────────────────────┘
                                │
                                ▼
┌─────────────────────────────────────────────────────────────────┐
│   ENCODING THE AMBIGUITY VALUE INTO AN ENCODED AMBIGUITY VALUE. │
│                              330                                │
└─────────────────────────────────────────────────────────────────┘
                                │
                                ▼
┌─────────────────────────────────────────────────────────────────┐
│  ASSEMBLING A MESSAGE INCLUDING THE ENCODED AMBIGUITY VALUE AND │
│              A TIME TAG REPRESENTING THE TIME.                  │
│                              340                                │
└─────────────────────────────────────────────────────────────────┘
                                │
                                ▼
┌─────────────────────────────────────────────────────────────────┐
│ TRANSMITTING THE MESSAGE FROM THE GLOBAL NAVIGATION SATELLITE   │
│ SYSTEM (GNSS) BASE STATION, WHEREBY THE ENCODED AMBIGUITY VALUE │
│  AND THE TIME TAG CONVEY INFORMATION REGARDING THE ORBIT TO A   │
│           GNSS RECEIVER IN RECEIPT OF THE MESSAGE.              │
│                              350                                │
└─────────────────────────────────────────────────────────────────┘
```

AT A GLOBAL NAVIGATION SATELLITE SYSTEM (GNSS) RECEIVER, RECEIVING A MESSAGE FROM A GNSS BASE STATION, THE MESSAGE COMPRISING A TIME TAG AND AN ENCODED AMBIGUITY VALUE DERIVED FROM A SATELLITE POSITION OF A GNSS SATELLITE, THE SATELLITE POSITION CALCULATED BY THE GNSS BASE STATION UTILIZING A FIRST ORBIT FOR THE GNSS SATELLITE AND A TIME REPRESENTED BY THE TIME TAG.
610

CALCULATING A SECOND SATELLITE POSITION FOR THE GNSS SATELLITE UTILIZING THE TIME REPRESENTED BY THE TIME TAG AND A BROADCAST ORBIT RECEIVED AT THE GNSS RECEIVER FROM THE GNSS SATELLITE.
620

RESOLVING A THIRD SATELLITE POSITION FOR THE GNSS SATELLITE UTILIZING THE ENCODED AMBIGUITY VALUE AND AN UNAMBIGUOUS PORTION OF THE SECOND SATELLITE POSITION.
630

DETERMINING THAT ORBITS USED AT THE GNSS BASE STATION AND THE GNSS RECEIVER ARE SYNCHRONIZED WHEN THE THIRD SATELLITE POSITION AND THE SECOND SATELLITE POSITION ARE IN AGREEMENT.
640

WHEN THE SECOND SATELLITE POSITION AND THIRD SATELLITE POSITION ARE NOT IN AGREEMENT, PERFORMING A NUDGING PROCESS TO ACHIEVE A NUDGED BROADCAST ORBIT.
650

FIG. 6

CONVEYING ORBIT INFORMATION VIA AMBIGUOUS POSITION INFORMATION

BACKGROUND

To improve upon the accuracy of positioning and navigation data obtainable using a Global Navigation Satellite System (GNSS) receiver, many techniques are employed. These include techniques such as differential corrections and Real Time Kinematics. A common feature of many of these techniques involves sending supplemental information to a GNSS receiver. This supplemental information is in addition to the information, such as broadcast orbits, that is received over-the-air via transmissions from GNSS satellites.

The supplemental information, referred to herein as "refinement information," is used at the GNSS receiver to refine the positioning and navigation data calculated by the GNSS receiver. Refinement information may include information such as: differential corrections (often referred to as correctors) calculated at a location other than the GNSS receiver; precise satellite orbits which are more exact than the contemporaneously valid over-the-air satellite orbits received from GNSS satellites; and raw measurable information (compressed or uncompressed) supplied from a differential or real-time kinematics base station or other source.

In addition to refinement information, handshaking information in the form of an 8-bit Issue of Data Ephemeris (IODE) handle is also often sent from a GNSS base station to a GNSS receiver. At the GNSS receiver, a received IODE handle is compared to an IODE handle associated with a broadcast orbit in use at the GNSS receiver to ensure that the same orbit is being used to perform calculations with refinement information as was used to originally calculate the refinement information. This handshaking, with respect to differential techniques, ensures that orbits are synchronized and thus allows the concept of common mode error rejection to be employed to cancel out certain errors that are common between a GNSS base station and a GNSS receiver. For example, a differential calculation performed using correctors received by a GNSS receiver will generate more accurate positioning and navigation data when the GNSS receiver uses the same orbit as used in originally calculating correctors. This is the case even if the orbit used at the GNSS receiver is more accurate than the orbit used to originally calculate the correctors. With respect to Global Positioning System (GPS) satellites, each GPS satellite transmits a new broadcast orbit for itself every two hours. Thus, in geographically separated GNSS base stations and GNSS receivers there exists a short window, after the beginning of the transmission of a new broadcast orbit, when orbit handshaking between a base station and a receiver takes on an increased importance. This is because either the base station or receiver may have received the new orbit before the other has received it.

To send a precise position or orbit for a single satellite could require 200 or more bits of information. To send an IODE for a single satellite requires 8-bits of information. Often there are as many as 12 visible GPS satellites for which refinement information or orbit handshaking information is supplied. This refinement information and orbit handshaking information may be supplied frequently, such as once per second, for each satellite. This can require a substantial number of bits. Moreover, the bits required to transmit such information increases even further if the information is supplied for other navigation satellites, such as, for example, the GLObal NAvigation Satellite System (GLONASS) satellites, future Galileo (European) satellites, and/or future Compass (Chinese) satellites.

If bandwidth were unlimited, this would not be a problem. However, bandwidth between a GNSS base station and a GNSS receiver is often limited by factors such as costs or transmission rates. For example, in some cases, such as over a cellular connection between a GNSS base station and a GNSS receiver, a user must pay a fee for the total amount of data transmitted or time over which data is transmitted. Thus additional data incurs additional fees. In other cases, transmission distances and power restrictions on transmitters in frequency bands used to support transmission between a GNSS base station and a GNSS receiver often limit transmission rates to very low speeds which are often in the range of 100 to 9600 bits/second.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a method of conveying information regarding an orbit used at a Global Navigation Satellite System (GNSS) base station to a GNSS receiver, a satellite position is determined for a particular time from an orbit of a GNSS satellite. An ambiguity value is extracted from the satellite position. The ambiguity value is extracted based upon a satellite position determination margin of error of a GNSS receiver. The ambiguity value is encoded into an encoded ambiguity value which is assembled into a message. The message also includes a time tag representing the particular time. The message is transmitted from the GNSS base station. The encoded ambiguity value and the time tag convey information regarding the orbit to a GNSS receiver in receipt of the message.

A base station is described which generates such a message, and a GNSS receiver is described which decodes and uses such a message. The GNSS receiver can use the message to determine whether or not its broadcast orbit is synchronized with the broadcast orbit used by the GNSS base station to generate the message. The GNSS receiver can also use the message to nudge its orbit into synchronization with the orbit used by the GNSS base station to generate the message.

BRIEF DESCRIPTION OF THE DRAWINGS

The accompanying drawings, which are incorporated in and form a part of this application, illustrate embodiments of the present technology for conveying orbit information via ambiguous position information, and together with the description, serve to explain the principles of the present technology. Unless noted, the drawings referred to this description should be understood as not being drawn to scale.

FIG. 3 is a flow diagram of an example method of conveying information regarding an orbit from a GNSS base station to a GNSS receiver, in accordance with an embodiment.

FIG. 6 is a flow diagram of an example method of synchronizing orbits used at a GNSS receiver and at a GNSS base station, without using an Issue of Data Ephemeris (IODE), in accordance with an embodiment.

DETAILED DESCRIPTION

Figure 1:
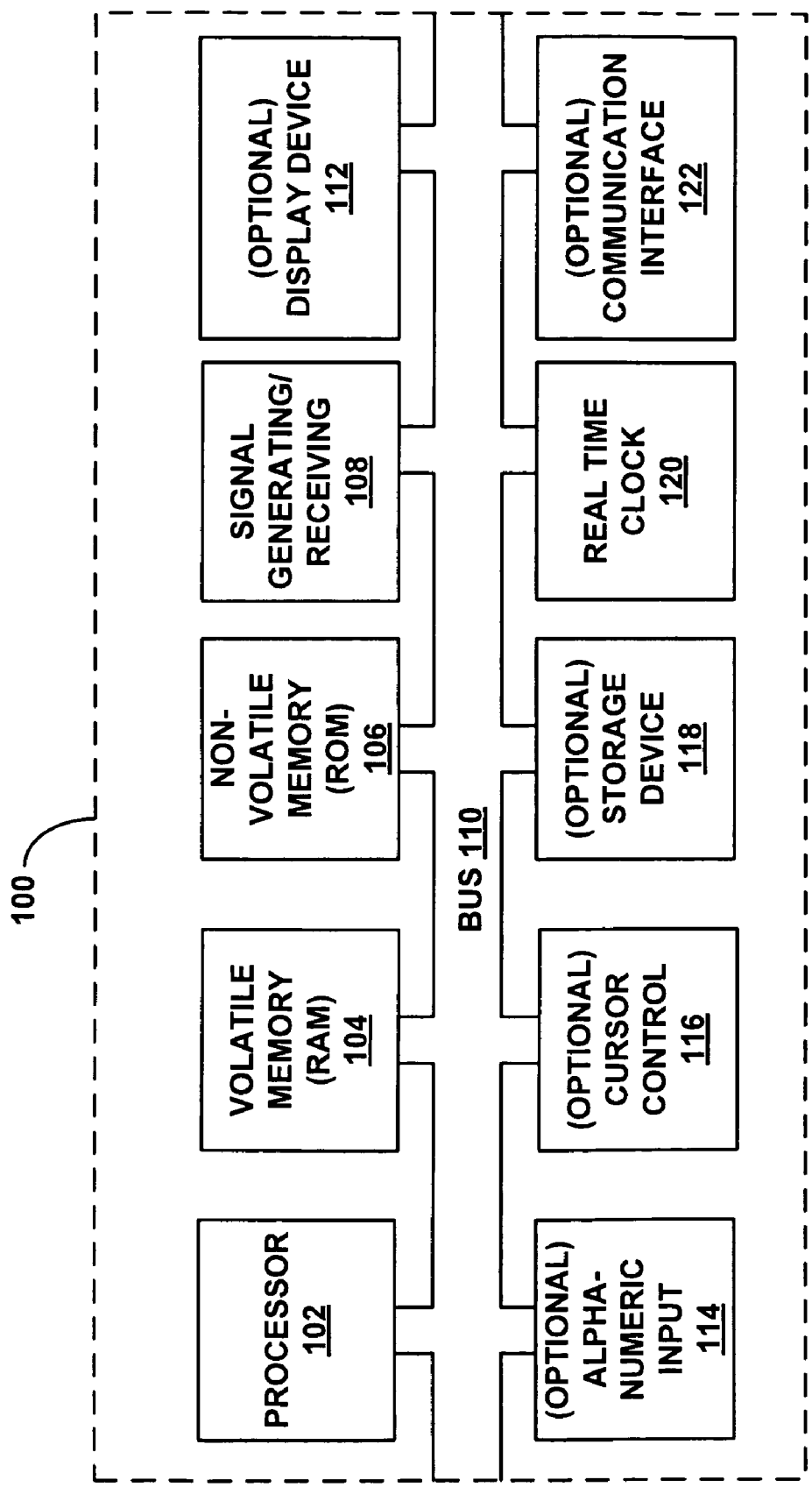
FIG. 1 is a block diagram of an example computer system used in accordance with an embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present detailed description, discussions utilizing terms such as "determining," "resolving," "removing," "extracting," "encoding," "assembling," "transmitting," "executing," "utilizing," "receiving," "calculating," "approving," "employing," "adjusting," "nudging," "computing," "solving," "deriving," "using," "including," or the like, refer to the actions and processes of a computer system (such as computer system 100 of FIG. 1), or similar electronic computing device. Computer system 100 or similar electronic computing device manipulates and transforms data represented as physical (electronic) quantities within the computer system's registers and memories into other data similarly represented as physical quantities within the computer system memories or registers or other such information storage, transmission, or display devices.

The subject matter discussed herein may be described in the general context of computer-executable instructions, such as modules, which are executed or executable by a computer. Generally, these modules include routines, programs, objects, components, data structures, etc., that perform or implement particular tasks or abstract data types.

Overview of Discussion

The subject matter presented herein describes the conveyance of orbit information for a GNSS satellite from a GNSS base station or other location to a GNSS receiver via the conveyance of position information of the GNSS satellite. For example, a first satellite position for a GNSS satellite is calculated by a GNSS base station or other entity for a satellite orbit and a time. An ambiguity window is used to partition a first satellite position value into an integer number and fractional number of ambiguity windows. The integer number of windows represents an ambiguous portion of the satellite position. This is because the integer number of windows is ambiguous without the inclusion of an "ambiguity value" represented by the fraction number of ambiguity windows. This ambiguity value is extracted, encoded, and assembled into a message along with the time tag which represents the time. The message is then transmitted from the GNSS base station for receipt by a GNSS receiver.

The technology described herein enables a GNSS receiver to locally recreate an approximation of the entire first satellite position from the ambiguity value in a received message. In this manner, the methods described herein, often allow for the benefits of transmitting a precise orbit, without requiring as many bits be transmitted as are conventionally transmitted for such purposes. In some embodiments, the bit savings garnered from use of the methods described herein may be incremental and sometimes non-existent in a single instance. However, in embodiments where a bit savings is realized, the bit savings mounts over time and multiples by the number of satellites about which data is transmitted. By transmitting information in this manner, the number of bits transmitted can often be reduced and thus link band utilization (between a base and a receiver) becomes more efficient. Improved efficiency allows newly freed space in the link band to be used for other purposes, including: transmitting additional information, supporting communications regarding an increase number of GNSS satellites, or to supporting more frequent updates.

In an embodiment, by determining a difference (if any) between the locally generated second satellite position and the recreated first satellite position, a GNSS receiver can determine if the satellite orbit it is using is synchronized with a broadcast orbit used to calculate the first satellite position. It is appreciated that in this manner, the encoded ambiguity value can be used to replace or eliminate the 8-bit IODE (Issue of Data Ephemeris) handle that is typically transmitted from a GNSS base station to a GNSS receiver for orbit synchronization purposes.

In some embodiments, a delta between the locally generated satellite position and the recreated first satellite position is used to adjust one or more parameters of the broadcast orbit for the purpose of nudging the broadcast orbit into synchronization with the orbit used to determine information included in the message. In one embodiment, in this manner, benefits of a precise orbit are obtained at the GNSS receiver without transmission of the entirety of the precise satellite orbit or position to the GNSS receiver. This reduces the number of bits transmitted in comparison to the conveyance of an entire precise satellite orbit or entire satellite position for a single satellite, which may require transmission of 100-200 bits or more from a GNSS base station to a GNSS receiver.

Discussion will begin with a description of an example computer system environment with which, or upon which, embodiments of the subject matter may operate. An example block diagram of a GNSS base station will be presented and described. A general description of the operation of the components of the GNSS base station will be provided. Operation of these components will then be described in greater detail in conjunction with description of an example method of conveying information regarding an orbit from GNSS base station to a GNSS receiver. To facilitate explanation of the method, an example diagram of an encoded ambiguity value and a message generated from a satellite position will be described. Discussion will then proceed to an example block diagram of a GNSS receiver. A general description of the operation of the components of the GNSS receiver will be provided. Operation of these components will then be described in greater detail in conjunction with description of an example method of synchronizing orbits used at a GNSS receiver and at a GNSS base station.

Example Computer System Environment

With reference now to FIG. 1, a block diagram is shown of an embodiment of an example computer system 100 which may be used in accordance with various embodiments described herein. It should be appreciated that computer system 100 is not strictly limited to being a computer system. As such, computer system 100 of the present embodiment may be well suited to be any type of computing device (e.g., a computing device utilized to perform calculations, processes, operations, and functions within a GNSS receiver, such as GNSS receiver 500 of FIG. 5A or receiver 570 of FIG. 5B, or within a GNSS base station, such as GNSS base station 200 of FIG. 2). Within the discussions herein, certain processes and steps are discussed that are realized, in one embodiment, as a series of instructions (e.g., software program) that reside within computer readable memory and are executed by a processor(s) of computer system 100. When executed, the instructions cause computer system 100 to perform specific actions and exhibit specific behavior that may be described in detail herein.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. Computer system 100 also includes data storage features such as a computer usable volatile memory 104 (e.g., random access memory, static RAM, dynamic RAM, etc.) coupled with bus 110 for storing information and instructions for central processor(s) 102, a computer usable non-volatile memory 106 (e.g., read only memory, programmable ROM, flash memory, EPROM, EEPROM, etc.) coupled with bus 110 for storing static information and instructions for processor(s) 102.

Computer system 100 also includes one or more signal generating and receiving devices 108 coupled with bus 110 for enabling computer system 100 to interface with other electronic devices and computer systems. Signal generating and receiving device(s) 108 of the present embodiment may include wired serial adaptors, modems, and network adaptors, wireless modems, and wireless network adaptors, and other such communication technology. The signal generating and receiving device(s) 108 may work in conjunction with one or more communication interface(s) 122 for coupling information to and/or from computer system 100. Communication interface 122 may include a serial port, parallel port, Universal Serial Bus (USB), Ethernet port, antenna, or other input/output interface. Communication interface 122 may physically, electrically, optically, or wirelessly (e.g. via radio frequency) couple a computer system, such as computer system 100 with another device, such as a cellular telephone, radio, or computer system.

Optionally, computer system 100 may include an alphanumeric input device 114 including alphanumeric and function keys coupled to the bus 110 for communicating information and command selections to the central processor(s) 102. Computer system 100 can include an optional cursor control or cursor directing device 116 coupled to the bus 110 for communicating user input information and command selections to the central processor(s) 102. The cursor directing device 116 may be implemented using a number of well-known devices such as a mouse, a track-ball, a track-pad, an optical tracking device, and a touch screen, among others. Alternatively, it is appreciated that a cursor may be directed and/or activated via input from the alphanumeric input device 114 using special keys and key sequence commands. The present embodiment is also well suited to directing a cursor by other means such as, for example, voice commands.

Computer system 100 of FIG. 1 may also include one or more optional computer usable data storage devices 118 such as a magnetic or optical disk and disk drive (e.g., hard drive, floppy diskette, Compact Disk-Read Only Memory (CD-ROM), Digital Versatile Disk (DVD)) coupled with bus 110 for storing information and/or computer executable instructions. An optional display device 112 may be coupled to bus 110 of computer system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user. A real time clock 120 is incorporated in computer system 100, when computer system 100 is utilized to perform functions of a GNSS receiver. For example, real time clock 120 may be used in conjunction with an orbit for a GNSS satellite to assist computer system 100 in quickly determining the proper frequency to tune to in order to receive information being broadcast from the GNSS satellite.

Example GNSS Base Station

Figure 2:
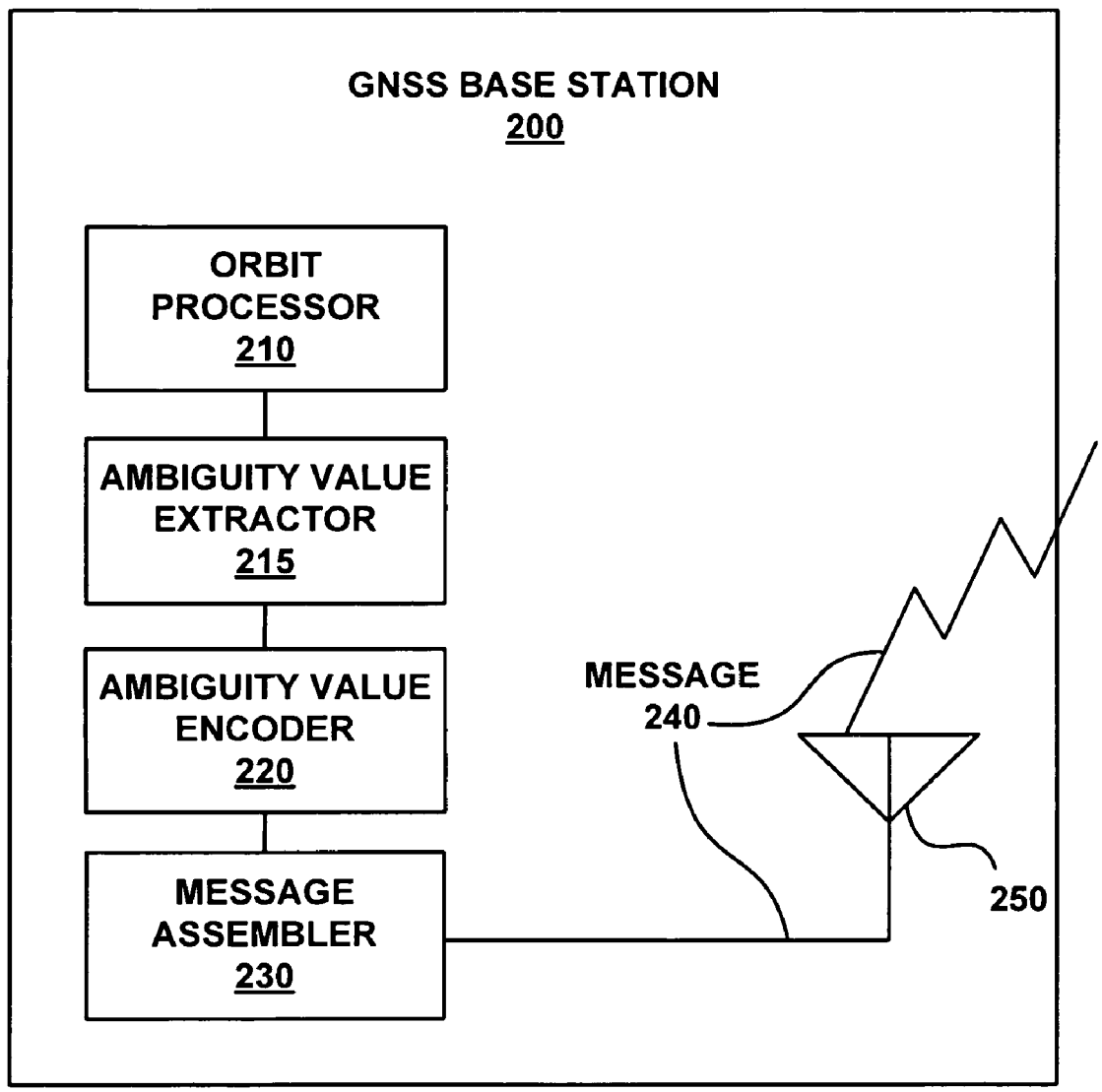
FIG. 2 is a block diagram of an example Global Navigation Satellite System (GNSS) base station, in accordance with an embodiment.

Referring now to FIG. 2, a block diagram is shown of an example GNSS base station 200. GNSS base station 200 is a positioning and navigating device which also serves as a base station for transmitting refinement information to GNSS receivers. It is appreciated that GNSS base station 200 may be collocated with or near a GNSS receiver to which it transmits refinement information. It is also appreciated that GNSS base station 200 may be located remotely (such as several kilometers or several hundred kilometers) from a GNSS receiver to which it transmits refinement information. In some embodiments, GNSS base station 200 is a reference station which is positioned on a known location, such as a surveyed location, so that refinement information may be calculated and transmitted to GNSS receivers in a particular region or on a job site (such as a farm or a construction site). In some embodiments, GNSS base station 200 is a GNSS Real Time Kinematics (RTK) base station that is used to transmit refinement information to a GNSS receiver. In some embodiments, GNSS base station 200 serves as a repeater to transmit refinement information received all or in part from another source.

As shown in the example implementation of FIG. 2, GNSS base station 200 comprises an orbit processor 210, an ambiguity value extractor 215, an ambiguity value encoder 220, a message assembler 230, and an antenna 250 which are coupled with one another for exchange of information and for generation and transmission of a message 240. An example arrangement and coupling of these components is shown, but it is appreciated that other arrangements of the components and/or their functionality are anticipated and possible. For example, in some embodiments, antenna 250 may be replaced with a coupling which allows GNSS base station 200 to be coupled with a transmission device such as a radio or a cellular telephone or wired network for the purpose of transmitting message 240. It is also appreciated that in many embodiments a base station, such as GNSS base station 200, includes a GNSS receiver, however this and other components have omitted from the example of FIG. 2 and from the following discussion in the interest of clarity.

Orbit processor 210 executes a GNSS orbit algorithm in association with an orbit of a GNSS satellite and a time in order to calculate a position of a GNSS satellite for the time. The functioning of such an orbit algorithm is well known. As one example, such an orbit algorithm executes a series of equations in order to determine the satellite position from parameters of the orbit. Such equations are well known and can be found, among other places, in the Global Positioning System (GPS) Interface Control Document, GPS-ICD-200 (10 Oct. 1993), which is freely available for download from the web based Navigation Center maintained by the United States Coast Guard and the United States Department of Homeland Security. Counterpart equations, which serve the same/similar purpose, can also be found in the GLONASS Interface Control Document, Version 5.0, copyright 2002, which is published by the 2002 Coordination Scientific Information Center and freely available for download. Orbit processor 210 can, for example, generate a position of the GNSS satellite using a broadcast orbit received from the GNSS satellite and the algorithm for use with a broadcast orbit, such as the algorithm described within GPS-ICD-200. Orbit processor 210 can also generate a more exact position of the GNSS satellite through use of a precise orbit, and an algorithm for use with the precise orbit. Such precise orbits and algorithms are also well known.

In some embodiments, orbit processor 210 also determines refinement information for the satellite using the same orbit and/or time. The refinement information is for use in refining positioning and navigation data calculated by a GNSS receiver and may be determined using differential techniques, real time kinematics techniques, or other techniques which are well known. As used herein, the term refinement information refers to information, such as atmospheric refinements, used by a GNSS receiver to refine the positioning and navigation data calculated by the GNSS receiver. Also, as used herein, refinement information is transmitted from a source, other than a GNSS satellite, which is external to the recipient GNSS receiver. For example, refinement information is often measured or calculated at a base station, such as GNSS base station 200, and then transmitted to a GNSS receiver, such as GNSS receiver 500 of FIG. 5A or receiver 570 of FIG. 5B. It is appreciated however, that orbit processor 210 does not generate the precise orbit using the broadcast algorithm; this is instead generated by other well known means or received from an outside source.

As referred to herein, refinement information may include corrections (often referred to as correctors) calculated according to differential techniques. Refinement information can also include precise satellite orbits which are more exact than the over-the-air broadcast orbits received from GNSS satellites. Refinement information may include raw measurable information (compressed or uncompressed) supplied from a differential or real-time kinematics base station or other source. Such raw measurable information can include errors in the orbits broadcast from a satellite, errors measured as a result of interference to the propagation of a signal from a GNSS satellite, measured position errors, and other errors and information measured by a base station. Refinement information may also include precise satellite position information which is more exact than the satellite position information which a GNSS receiver can generate from over-the-air information received from GNSS satellites.

An orbit utilized by orbit processor 210 comprises a variety of parameters. These may be the parameters of a broadcast orbit received from a GNSS satellite, such as a GPS satellite. These may also be the parameters of a precise orbit. A precise orbit is an orbit which defines the orbit of the GNSS satellite to a greater exactness than it is defined by a broadcast orbit. The precise orbit may include more exact versions of the same parameters that are included in a broadcast orbit, may include additional or different parameters from those included in the broadcast orbit, or some combination. For example, GPS and GLONASS use different parameters in their broadcast orbits. Moreover, in the future, additional parameters (beyond those shown in Table 1) may be added to the GPS broadcast. The parameters of satellite orbits are well known but the number of parameters used to define an orbit may vary depending on the exactness with which an orbit is defined, the length of time for which the orbit is defined, and/or the particularities of a GNSS constellation. As an example for use in the discussion herein, the parameters of a broadcast orbit which is typically transmitted from a GPS satellite are listed in Table 1. Further definitions and uses of these terms can be found at least in the GPS Interface Control Document, GPS-ICD-200 (10 Oct. 1993).

TABLE 1

Parameters of a Broadcast Orbit Transmitted from a GPS Satellite

| | |
|---|---|
| $M_0$ | Mean anomaly at reference time |
| $\Delta n$ | Mean motion difference from computed value |
| e | Eccentricity |
| $(A)^{1/2}$ | Square root of the semi-major axis (referred to herein as "roota") |
| $(\Omega)_0$ | Longitude of ascending node of orbit plane at weekly epoch |
| $i_0$ | Inclination angle at reference time |
| $\omega$ | Argument of perigee |
| $\Omega$-dot | Rate of right ascension |
| i-dot | Rate of inclination angle |
| $C_{uc}$ | Amplitude of the cosine harmonic correction term to the argument of latitude |
| $C_{us}$ | Amplitude of the sine harmonic correction term to the argument of latitude |
| $C_{rc}$ | Amplitude of the cosine harmonic correction term to the orbit radius |
| $C_{rs}$ | Amplitude of the sine harmonic correction term to the orbit radius |
| $C_{ic}$ | Amplitude of the cosine harmonic correction term to the angle of inclination |
| $C_{is}$ | Amplitude of the sine harmonic correction term to the angle of inclination |
| $T_{oe}$ | Reference Time Ephemeris |

Ambiguity value extractor 215 determines a portion of a satellite position which is likely to be in range of ambiguity when compared to a second satellite position generated locally at a GNSS receiver. Ambiguity value extractor 215 then extracts an ambiguity value from the satellite position based upon a satellite position determination margin of error of a GNSS receiver that is intended to receive, or could, be a recipient of the ambiguity value. Consider a second satellite position determined for a GNSS satellite at a GNSS receiver, using a valid broadcast orbit. This second satellite position will share a majority of most significant digits with a first satellite position generated by orbit processor 210. This is true even if the first satellite position is generated with a precise orbit, or with a different, but also valid broadcast orbit (which is possible if the GNSS base station and GNSS receiver are out of sync or are located far apart from one another). However, in this example, as in other cases, there will be an ambiguity range that encompasses some portion of the least significant digits of the satellite position. Put differently, the ambiguity range is typically found within the least significant digits of the first satellite position and second satellite position which may be in disagreement and/or which may differ for a variety of reasons. Without this ambiguity range, or "ambiguity value," the in-common portion of the most significant bits of the first satellite position and the second satellite position, although shared, is ambiguous and without useful meaning.

Based upon known capabilities of GNSS receivers and known algorithms used by GNSS receivers, ambiguity value extractor 215 is aware of the margin of error within which a GNSS receiver is capable of determining the second position when using a broadcast orbit. This margin of error, which may include a safety factor of some percentage beyond the margin of error, is used as an ambiguity window to determine an ambiguity value from one or more coordinates of the first satellite position. The ambiguity value represents the least significant digits of a coordinate, or some portion thereof, which have been determined to be in the range of ambiguity of the GNSS receiver and the precision of the first satellite position. It is appreciated that in some embodiments, ambiguity value extractor 215 may also apply rounding to an ambiguity value, for example to round the ambiguity value to the level of accuracy to which the first satellite position is reliably known. Ambiguity value extractor 215 couples the ambiguity value to ambiguity value encoder 220.

Generally, the ambiguity value which is encoded depends upon two factors. The first factor is the size of an ambiguity window within which an intended recipient GNSS receiver is capable of locally solving for the satellite position through use of a broadcast orbit. The second factor, in the instance of a precise orbit, is the amount of resolution, beyond that of the intended recipient GNSS receiver, which is desired to be conveyed.

Ambiguity value encoder 220 encodes the ambiguity value that is determined by ambiguity value extractor 215. This entails ambiguity value encoder 220 encoding the ambiguity value into binary bits which comprise an encoded ambiguity value. This can be a direct translation from a digital value to a binary value, or an encoding that employs some form of compression or coding to create the encoded ambiguity value. This encoded ambiguity value is provided to message assembler 230 for inclusion in a message for transmission to a GNSS receiver. As will be described further, a satellite position of a GNSS satellite is typically comprised of x, y, and z coordinates that define the satellite position in a three dimensional coordinate space which uses the center of Earth as an origin. Thus, a typical x, y, or z coordinate of a GNSS satellite position will be a number in the range of roughly +/−30,000,000,000 millimeters. It is appreciated that this range may vary slightly based upon the particular GNSS constellation (e.g., GPS, GLONASS, GALILEO). Similarly, x, y, and z components used in WAAS (Wide Area Augmentation System) signals are between roughly +/−50,000,000 meters. As a particular example, an x-coordinate of a satellite position, of GPS satellite 26, at a particular time may be −19,428,237.5853 meters.

Message assembler 230 assembles a message 240 comprising the encoded ambiguity value received from ambiguity value encoder 220 and a time tag. The time tag represents the time associated with the satellite position which the encoded ambiguity value represents and from which it was extracted. As will be further described herein, message 240 comprises a series of binary bits and is designed for transmission from GNSS base station 200 to a GNSS receiver that is capable of receiving and recognizing the information represented within it. In addition to the time tag and encoded ambiguity value derived from a satellite position, it is appreciated that message assembler 230 may include other information in message 240.

Some examples of other information that message assembler 230 may assemble into message 240 include: a satellite identifier for a particular GNSS satellite; a constellation identifier for a particular GNSS constellation (e.g., the GPS constellation, the GLONASS constellation, or some other GNSS constellation); a header block; an error corrections block; GNSS clock error information; a window size related to an encoded ambiguity value in the message; a precision identifier related to an encoded ambiguity value in the message; and one or more blocks of refinement information. It is appreciated that, in some embodiments, one or more bits in the header block or some other portion of message 240 are used to indicate whether an encoded ambiguity value has been generated from a broadcast orbit or a precise orbit. Once message assembler 230 has assembled message 240, message 240 is coupled to antenna 250 or another transmission means such that message 240 may be transmitted for receipt by one or more GNSS receivers.

Example Method of Conveying Information Regarding an Orbit

The above discussion has set forth the operation of an example device, GNSS base station 200, according to embodiments described herein. With reference to FIG. 3, flow diagram 300 describes steps of a method that are performed using components and/or functions of GNSS base station 200. In various embodiments the method of flow diagram 300, is carried out by a processor under the control of computer-readable and computer-executable instructions. Thus, in some embodiments, this method is implemented via a computer, such as computer system 100 of FIG. 1, which may be used to implement some of the functions and/or components of GNSS base station 200. The computer-readable and computer-executable instructions reside, for example, in data storage features such as computer usable/readable volatile memory 104, computer usable/readable non-volatile memory 106, or computer useable/readable media of storage device 118 of computer system 100 (all shown in FIG. 1). The computer-readable and computer-executable instructions, which may reside on computer useable/readable media, are used to control or operate in conjunction with, for example, processor 102 of FIG. 1. Although specific steps are disclosed in flow diagram 300, such steps are examples. That is, embodiments are well suited to performing various other steps or variations of the steps recited. It is appreciated that the steps in flow diagram 300 may be performed in an order different than presented, and that not all of the steps in flow diagram 300 may be performed.

FIG. 3 illustrates a flow diagram 300 of an example method of conveying information regarding an orbit, in accordance with one embodiment. This method may be may be performed by a GNSS base station, such as GNSS base station 200. For purposes of example, and not of limitation, operation of the method of flow diagram 300 is described with reference to components and functionality GNSS base station 200 of FIG. 2 and with reference to elements of the diagram of message creation shown in FIG. 4.

At 310 of flow diagram 300, in one embodiment, the method determines a satellite position for a particular time from an orbit of the satellite. As described herein, in one embodiment, orbit processor 210 of GNSS base station 200 determines a satellite position for a GNSS satellite for a particular time using an orbit of the GNSS satellite. In one embodiment, the orbit used to determine a satellite position is a precise orbit for the GNSS satellite, while in another embodiment, the orbit used to determine the satellite position is a broadcast orbit that has been received from the GNSS satellite. For example, in one embodiment where it is desired to convey broadcast orbit information between GNSS base station 200 and a GNSS receiver, a broadcast orbit received from the satellite is utilized by orbit processor 210 to determine the satellite position. In one embodiment where it is desired to convey precise orbit information from GNSS base station 200 to a GNSS receiver, a precise orbit is utilized by orbit processor 210 to determine the satellite position.

At 320 of flow diagram 300, in one embodiment, the method extracts an ambiguity value from the satellite position. The extracting is based upon a satellite position determination margin of error of a GNSS receiver and involves removing an ambiguous portion of the satellite position to arrive at and extract the ambiguity value. The margin of error may be particular to an intended GNSS receiver or common to a wide variety of GNSS receivers.

It is appreciated that in various embodiments, the extracted ambiguity value comprises all or a portion of a range of least significant digits of at least one of an x, y, or z coordinate of the satellite position, while the ambiguous portion comprises the remaining portion of most significant digits of the satellite position. In some embodiments, ambiguity values for more than one (or all) x, y or z coordinates of the satellite position are extracted. As will be described below, in embodiments where the ambiguity value is being used for purposes conveying orbit information to a GNSS receiver, the extracted ambiguity value of an x, y, or z coordinate of the satellite position does not include IODE information. It is appreciated that in such embodiments, the message comprising the encoded ambiguity value is not required to include IODE information. Moreover, when employing the method of flow diagrams 300 and/or 600 no IODE information need be exchanged from the GNSS base station to the GNSS receiver for the purpose of synchronizing an orbit in use at a GNSS receiver with an orbit used by a GNSS base station.

Ambiguity value extractor 215 determines an ambiguity window which allows a sufficient portion of the satellite position to be captured and extracted as an ambiguity value, so that an intended recipient is enabled to recreate an approximation of the satellite position (or coordinate thereof) from the ambiguity value and an otherwise ambiguous portion of most significant digits of a version of the satellite position generated locally at the GNSS receiver. This recreation is possible due to the fact that satellite positions generated with valid broadcast orbits or precise orbits will be identical for a majority of the most significant digits and will only vary, if at all, in some portion of the least significant digits (this portion being encompassed by the ambiguity value).

As part of extracting an ambiguity value, in one embodiment, ambiguity value extractor 215 employs an ambiguity window which is at least as large as a maximum satellite position determination margin of error of a GNSS receiver that is an intended recipient of a message. In some instances this ambiguity window also includes, as a safety factor, a slightly larger range than the maximum satellite position determination margin of error of the GNSS receiver. Thus, for example, if a particular intended GNSS receiver is capable of independent local determination of a satellite position to within +/−10 meters of the actual satellite position, ambiguity value extractor 215 employs an ambiguity window at least large enough to cover this range of +/−10 meters of ambiguity (for a range of 20 meters). In some embodiments ambiguity value extractor 215 employs an ambiguity window that is slightly larger as a safety factor. This can include adding some percentage, such as 5%, 20%, or 100% to the size of the ambiguity window. It can also include rounding the ambiguity window up to a full power-of-two size larger than the ambiguity window. For example, an ambiguity window of 20 meters can be rounded up to 32 meters. The ambiguity window is then used to determine the ambiguous portion (most significant digits or portion thereof) of the satellite position in these particular circumstances, and then extract the ambiguity value (least significant digits or portion thereof) associated with one or more of the coordinates of the satellite position.

Moreover, based upon the known broadcast orbits, which are capable of being received and therefore in use by a GNSS receiver, GNSS base station 200 can compute the satellite positions that a GNSS receiver would calculate from such broadcast orbits. Based upon these computed positions, the size of a window ambiguity used for resolving the ambiguity value can be increased or decreased by the GNSS base station based upon the expected outcome of a position determination algorithm at a GNSS receiver. Thus, if the maximum satellite position determination margin of error of a GNSS receiver is +/−10 meters, but the error for a particular position determination calculation is within +/−5 meters of actual satellite position, ambiguity value extractor 215 can temporarily shrink the size ambiguity window that is used.

Consider an example, which will be referred to as Example A, where orbit processor 210 determines from a broadcast orbit that a satellite position for GPS satellite 26 (Pseudo-Random Noise 26) at a particular time of 2004 9 29 1 44 30.00000000 (in the format of YMDHMS) is: x=−19,438,237.5853 m; y=−2,814,138.370 m; and z=17,869,527.215 m. Suppose that it is Known by GNSS base station 200 that an intended GNSS receiver will have a broadcast orbit which will compute an x-coordinate value with a typical error of +/−3 meters with an error that is never greater than +/−10 meters. Clearly ambiguity value extractor 215 could choose an ambiguity window of 20 meters width, and it would suffice. However, in this example, an additional margin of safety is added, and the ambiguity window is set at 32 meters width. Additionally, in this example, the GNSS base station 200 is using a broadcast orbit and is only capable of determining the satellite position to within +/−2 meters accuracy. Thus, in this example, an ambiguity value will be rounded to the nearest 4 meters, creating a worst case rounding error of +/−2 meters, but saving on data transmitted.

In accordance with Example A, in one embodiment, ambiguity value extractor 215 extracts an ambiguity value from the x-coordinate of the satellite position in the following manner. An offset of 100,000,000 is added to the value of the x-coordinate to convert it into a positive number. This results in a value of 80,561,762.4147 meters, which is then divided by the size of the ambiguity window (32 meters) to determine a number of window units. A result of 2,517,555.07546 window units is obtained, and the full window units (the ambiguous most significant digits portion of the satellite position) are discarded, leaving a 0.07546 window units remainder which will become the ambiguity value. This remainder is multiplied by 32 meters to convert the partial window units back into meters, resulting in a value of 2.4147 meters. If not for the known accuracy limitations of GNSS base station 200, this would represent the ambiguity value. However, the value of 2.4147 is rounded to the nearest 4 meters, resulting in an ambiguity value of 4 meters which is then provided to ambiguity value encoder 220. Of note, in this example, if the ambiguity value had turned out to be 32 meters (a full ambiguity window), the ambiguity value would be set at 0.

Consider another example, which will be referred to as Example B, where orbit processor 210 determines from a precise orbit that a satellite position for GPS satellite 26 (PRN 26) at a time of 2004 9 29 1 44 30.00000000 is: x=−19,438,237.5853 m; y=−2,814,138.370 m; and z=17,869,527.215 m. In this example, the precise orbit generates a position that is accurate to within 4 mm of the actual position of GPS satellite 26. The same assumptions with respect to a GNSS receiver still exist as were outlined in Example A, and an ambiguity window of 32 meters is also used here in Example B. In Example B, a least significant digit of 4 mm will be assumed for position coordinates determined using the precise orbit, and thus ambiguity values will be rounded to the nearest 4 mm (0.004 m). Thus, in this example, an ambiguity value will be rounded to the nearest 4 mm, creating a worst case rounding error of +/−2 mm, but saving on data transmitted. Note that 32 meters (the ambiguity window size) divided by 0.004 yields a maximum ambiguity value of 8000, with 2000 distinct ambiguity values possible. Using an encoding scheme where a binary value of "0000000000001" equates to 4 mm. Where each additional bit equates to 4 more millimeters, 13 binary bits will be need to transmit an encoded ambiguity value of a single coordinate of a satellite position. It should be noted that $2^{13}$ equates to a decimal value of 8192, and thus the ambiguity window size could be increased to 32.768 meters to efficiently use the bandwidth of 13 bits and to add a little more margin of safety. However, for clarity, that possibility is ignored in Example B.

In accordance with Example B, in one embodiment, ambiguity value extractor 215 extracts an ambiguity value from the x-coordinate of the satellite position in the following manner. An offset of 100,000,000 is added to the value of the x-coordinate to convert it into a positive number. This results in a value of 80,561,762.4147 meters, which is then divided by the size of the ambiguity window (32 meters) to determine a number of window units. A result of 2,517,555.07546 window units is obtained, and the full window units (the ambiguous most significant digits portion of the satellite position) are discarded, leaving a 0.07546 window units remainder which will become the ambiguity value. This remainder is multiplied by 32 meters to convert the window units back into meters, resulting in a value of 2.4147 meters. If not for the known accuracy limitations of GNSS base station 200, this would represent the ambiguity value. However, the value of 2.4147 is rounded to the nearest 0.004 meters, resulting in an ambiguity value of 2.416 meters which is then provided to ambiguity value encoder 220. Of note, in this example, if the ambiguity value had turned out to be 32.000 meters (a full ambiguity window), the ambiguity value would be set at 0.000.

At 330 of flow diagram 300, in one embodiment, the method encodes the ambiguity value into an encoded ambiguity value. For example, ambiguity value encoder 220 of GNSS base station 200 encodes the ambiguity value received from ambiguity value extractor 215. The ambiguity value that is encoded is derived, as described above, from an x, y, or z coordinate of the GNSS satellite position determined, for example, by GNSS base station 200. As will be further described, the ambiguity value is encoded such that a recipient GNSS receiver is enabled to recreate an approximation of a coordinate of the GNSS satellite position (from which the ambiguity value was derived). The GNSS receiver performs the recreation by combining the ambiguity value and an ambiguous portion of a second satellite position generated locally at the GNSS receiver using a broadcast orbit received over-the-air from the GNSS satellite. The encoded ambiguity value is then provided to message assembler 230. This encoding of the ambiguity value can be as simple as directly converting a decimal value into a binary value, or it can be more complex.

Referring again to Example A, in one instance, the ambiguity value is directly encoded into a binary representation, in this manner, an ambiguity value of 4 meters is encoded as a binary value of "100," and an ambiguity value of 28 is encoded as a binary value of "11100." However, because of rounding, the least significant digit in the ambiguity value of Example A will always be a multiple of 4 (0 m, 4 m, 8 m, 12 m, 16 m, 20 m, 24 m, 28 m, 32 m). Ambiguity value encoder 220, in one embodiment, takes advantage of this situation and uses only 3 bits to encode the ambiguity value of the x-coordinate. For example: 000 binary=0 meters or 32 meters; 001 binary=4 meters; 010 binary=8 meters . . . 111 binary=28 meters. Thus in this manner the total number of bits needed to encode the ambiguity values for the x, y, and z coordinates if the GNSS satellite position will be 9 bits. Without using the method of flow diagram 300, 24 bits would have been required to directly encode each of the x, y, and z coordinates; for a total of 72 bits. It is appreciated that these are examples only, and that other encoding techniques may be used to encode an ambiguity value. It is also appreciated that in other embodiments, the ambiguity value which is encoded may be larger or smaller than the ambiguity value of Example A.

Referring again to Example B, in one instance, the ambiguity value of 2.416 meters is encoded as a binary value of "000100101110." Because of rounding, the least significant digit in the ambiguity value of Example B will always be a multiple of 4 mm (0 mm, 4 mm, 8 mm, 12 mm, . . . , 31,996 mm). Ambiguity value encoder 220, in one embodiment, takes advantage of this situation employs an encoding scheme similar to the scheme of Example A, and uses only 13 bits to encode the ambiguity value of the x-coordinate. For example the number of millimeters in the ambiguity value is divided by 4, and the dividend is encoded as the encoded ambiguity value. In this instance, 2416 mm divided by 4 results in a decimal value of 604. Ambiguity value encoder 220 encodes this decimal value 604 into an encoded ambiguity value of "000100101110," binary. Thus in this manner the total number of bits needed to encode the ambiguity values for the x, y, and z coordinates if the GNSS satellite position will be 39 bits. Without using the method of flow diagram 300, 34 bits would have been required to directly encode each of the x, y, and z coordinates; for a total of 102 bits. It is appreciated that these are examples only, and that other encoding techniques may be used to encode an ambiguity value. It is also appreciated that in other embodiments, the ambiguity value which is encoded may be larger or smaller than the ambiguity value of Example B.

At 340 of flow diagram 300, in one embodiment, the method assembles a message including the encoded ambiguity value. The assembled message also includes a time tag representing the time used for generation of the satellite position from which the encoded ambiguity value was derived. The encoded ambiguity value and the time tag convey information regarding an orbit used to generate the satellite position from which the encoded ambiguity value was derived. For example, the encoded ambiguity value and time tag in the assembled message convey orbit information to a GNSS receiver by providing enough information to allow a GNSS receiver in receipt of message to recreate an approximation of the satellite position from which the ambiguity value was derived. A GNSS receiver in receipt of the assembled message can utilize the recreated satellite position to determine if its broadcast orbit is synchronized with a broadcast orbit in use at GNSS base station 200. Additionally, when a delta, or difference, exists between a recreated satellite position and a locally generated satellite position, the GNSS receiver in receipt of the assembled message can use the delta to nudge its broadcast orbit into synchronization with the orbit used by GNSS base station 200 to determine the satellite position from which the encoded ambiguity value was derived.

In one embodiment, as described herein, message assembler 230 performs assembly of a message 240 which includes the encoded ambiguity value and a time tag associated with the determination of the satellite position from which the encoded ambiguity value was derived. Time tags are often supplied in conjunction with a variety of messages transmitted from a GNSS base station to a GNSS receiver. It is appreciated that the concept of a time tag is well known and its content is not described in detail herein.

In one embodiment, message assembler 230 assembles a message such as message 240 to include other information, such as refinement information for use by a recipient GNSS receiver in refining positioning and navigation data calculated by the recipient GNSS receiver. This refinement information can comprise correctors, raw measurement information, or other refinement information.

In one embodiment, message assembler 230 assembles a message such as message 240 to include or convey descriptive information regarding the encoded ambiguity value. Such descriptive information can be included in the header or some other portion of the message. This descriptive information can include: the precision of a least significant bit of the encoded ambiguity value, the size of an ambiguity window, and the type of orbit (broadcast or precise) used in generating the satellite position from which the encoded ambiguity value was derived.

Figure 4:
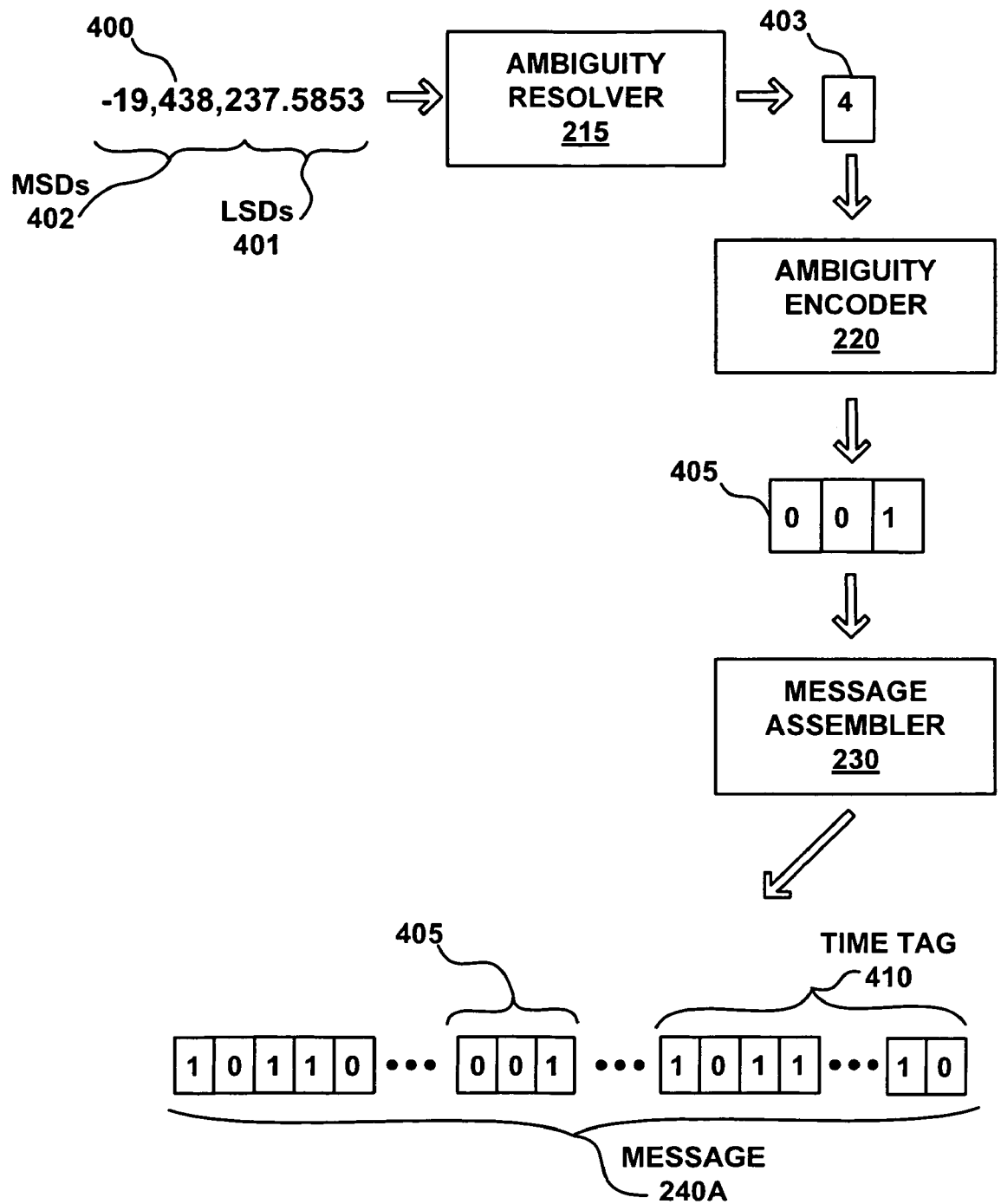
FIG. 4 is diagram of creation of a message, in accordance with an embodiment.

With reference to FIG. 4, a diagram of creation of a message is shown, in accordance with an embodiment. FIG. 4 illustrates creation of a message using information from the above described Example A. A position 400 is shown which represents the x-coordinate portion of the position described above in Example A. Some portion of least significant digits 401 will be extracted to form the ambiguity value, while the remaining portion of least significant digits 401 and all of most significant digits 402 will be ambiguous (without the ambiguity value). As shown, position 400 is provided to ambiguity value extractor 215, which extracts an ambiguity value 403 of 4 meters, in the manner described above in Example A. Ambiguity value 403 is provided to ambiguity value encoder 220, which encodes it into an encoded ambiguity value 405. Encoded ambiguity value 405 is then provided to message assembler 230 which includes the encoded ambiguity value in an assembled message 240A along with a time tag 410 associated with the determination of position 400. It is appreciated that additional information, as previously described, may be assembled into message 240A. It is also appreciated that the information may be assembled in a different sequence than shown in FIG. 4. It is further appreciated that the ambiguity value of Example B can be used to create a message 240 in a similar fashion to that illustrated in FIG. 4 using the ambiguity value of Example A.

At 350 of flow diagram 300, in one embodiment, the assembled message is transmitted from the GNSS base station. For example, with reference to GNSS base station 200, in one embodiment this comprises transmitting message 240 from GNSS base station 200 via antenna 250. In other embodiments message 240 may be transmitted via other transmission devices such as a radio, wireless computer network, or cellular telephone to which GNSS base station 200 is coupled. By such transmission, the encoded ambiguity value and time tag included in the message convey information regarding an orbit used at GNSS base station 200 to a recipient of message 240.

Example GNSS Receivers

Figure 5A:
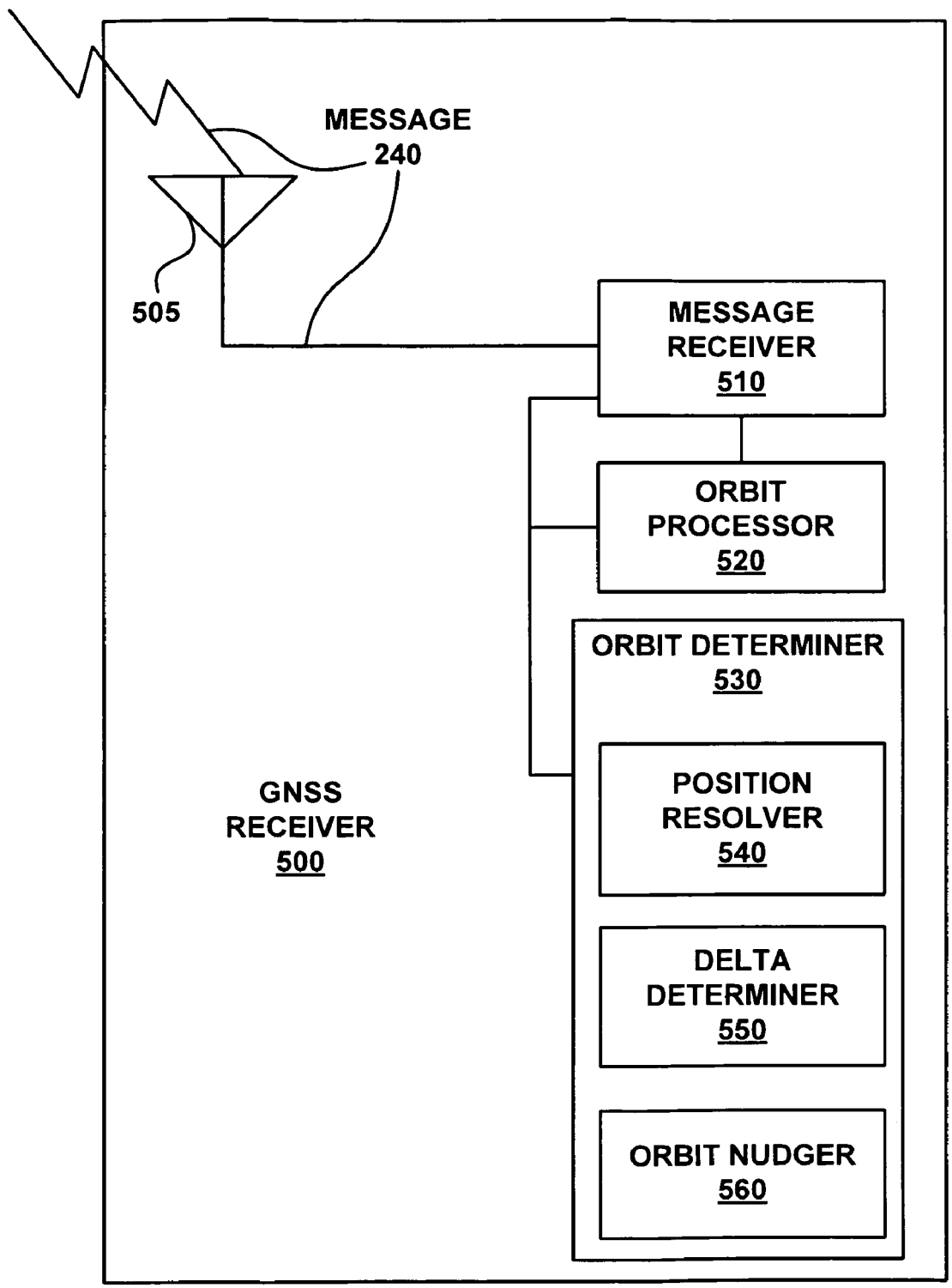
FIG. 5A is a block diagram of a first example GNSS receiver, in accordance with an embodiment.

Referring now to FIG. 5A, a block diagram is shown of a first example GNSS receiver 500, used in accordance with an embodiment. GNSS receiver 500 is a positioning and navigating device which also comprises a message receiver 510, an orbit processor 520, and an orbit determiner 530 which are coupled with one another for exchange of information. An example of such configuration is shown, but others are possible. In some embodiments, orbit determiner 530 also comprises one or more additional components such as position resolver 540, delta determiner 550, and/or orbit nudger 560. As will be further described herein, GNSS receiver 500 is configured to receive and decode a message, such as message 240 (see FIG. 2 and FIG. 3), that is transmitted from another device, such as GNSS base station 200. The transmission may be received over-the-air by an antenna, as shown in FIG. 5A, or via a wire line connection such as to a computer network, the Internet, or a telephone network.

Figure 5B:
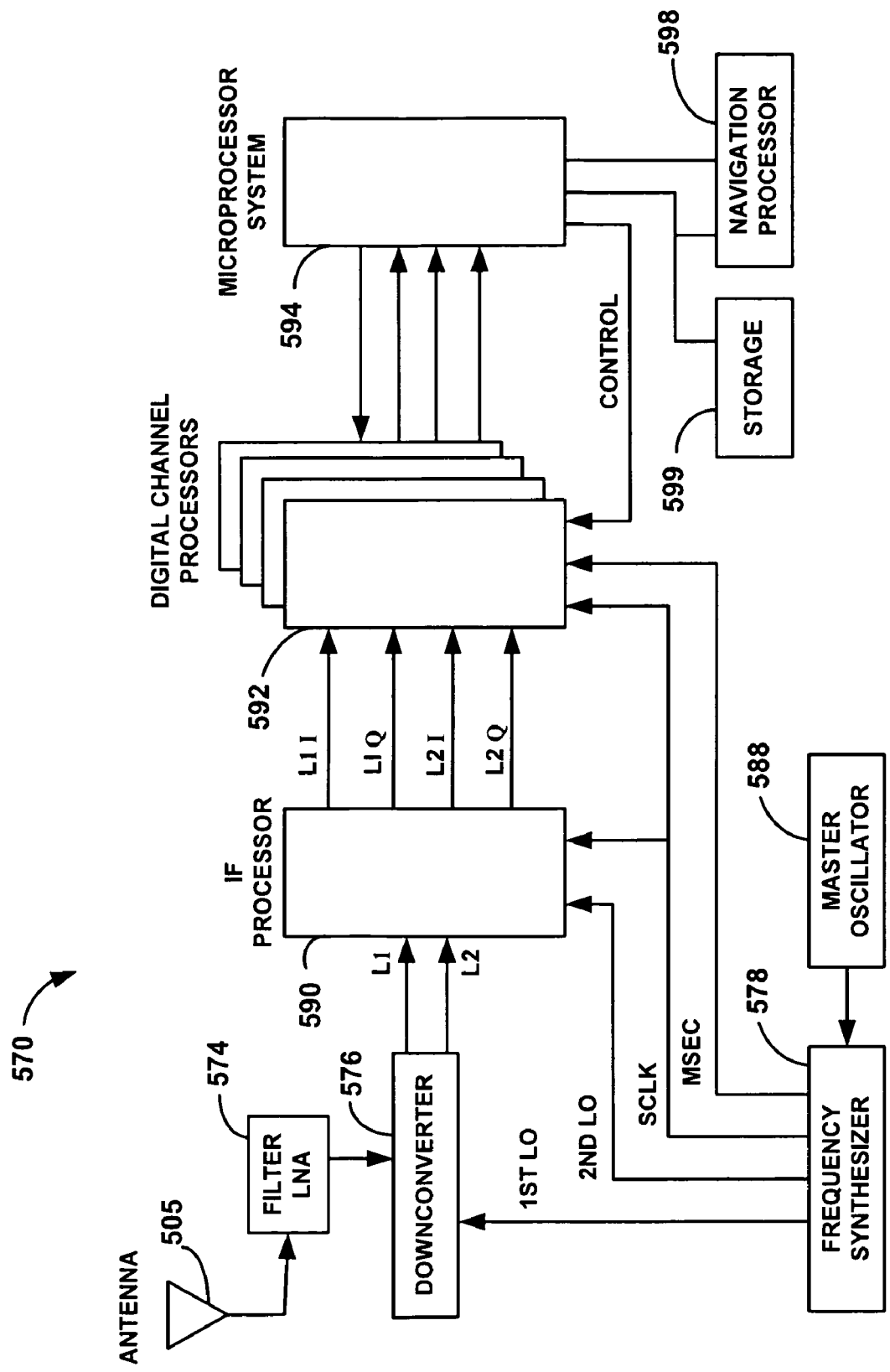
FIG. 5B is block diagram of a second example Global Navigation Satellite System (GNSS) receiver used in accordance with an embodiment

The general operation of a GNSS receiver, in so far as receiving broadcasts from GNSS satellites and calculating positioning and navigation data, is well known and will be described only briefly herein with respect to FIG. 5A. In brief, GNSS receiver 500 receives broadcasts from a plurality of global navigation satellites that may be a part of one or more Global Navigation Satellite Systems. For example, in various embodiments, the positioning and/or navigating capabilities of GNSS receiver 500 may be based on signals from GPS satellites, GLONASS satellites, Galileo satellites (when operational), and Compass satellites (when operational). Additionally, positioning capabilities of GNSS receiver 500 may be based on signals received from a WAAS (wide area augmentation service), the European Geostationary Navigation Overlay Service (EGNOS) (when operational), and the like. Based upon these signals, and in some instances on other refinement information, GNSS receiver 500 determines timing and also calculates positioning and navigation data. It is appreciated that GNSS receiver 500 may be a GPS receiver, such as a handheld or portable GPS receiver, which may be equipped with a display device 112 (FIG. 1) for viewing positioning and navigation data. FIG. 5B, described below, shows one example block diagram of a second GNSS receiver in which components and/or functions shown in FIG. 5A can be implemented, in an embodiment Message receiver 510 receives a message transmitted to or broadcast for reception by GNSS receiver 500. For example, in one embodiment, message receiver 510 receives a message, such as message 240, which is transmitted, such as over-the-air or via a wire line connection, from GNSS base station 200 (FIG. 2) and includes a time tag associated with a satellite position and an encoded ambiguity value derived from the satellite position. By being associated with the satellite position, what is meant is that the time tag represents the time for which the satellite position was determined (for example the time at which the satellite position was determined by GNSS base station 200). Such a message may be initially received via a wire line connection such as to a computer network, the Internet, or a telephone network, or over-the-air by antenna 505 or another wireless reception device such as a cellular telephone, radio, or wireless computer network receiver. Once received at a GNSS receiver, the message is coupled to message receiver 510. Message receiver 510 parcels out various portions of the message, such as the encoded ambiguity value and time tag, and routes them to appropriate portions of GNSS receiver 500. For example, in one embodiment, the time tag is provided to orbit processor 520 and the encoded ambiguity value is provided to orbit determiner 530.

As previously described a message, such as message 240, may also include refinement information associated with the time tag. Once again, by being associated, what is meant is that one or more portions of the refinement information have been calculated for the time represented by the time tag. The refinement information can include correctors, raw measurable data measured by GNSS base station 200, or other refinement information. The refinement information, once decoded, is used by GNSS receiver 500 in refining positioning and navigation data calculated by GNSS receiver 500. In some embodiments, as will be described herein, the refinement information is not used until it is determined that an orbit in use at GNSS receiver 500 is synchronized with (the same as) the satellite orbit used to calculate the refinement information.

Orbit processor 520 executes a GNSS orbit algorithm in association with an orbit of a GNSS satellite and a time to determine a position of the GNSS satellite for the time. The functioning of such an orbit algorithm is well known. As one example, such an orbit algorithm executes a series of equations in order to determine the satellite position from parameters of an orbit of a GNSS satellite. Such equations are well known and can be found, among other places, in the Global Positioning System (GPS) Interface Control Document, GPS-ICD-200 (10 Oct. 1993), which is freely available for download from the web based Navigation Center maintained by the United States Coast Guard and the United States Department of Homeland Security.

As employed with the presently described subject matter, orbit processor 520 utilizes a broadcast orbit received from a GNSS satellite to determine a satellite position of the GNSS satellite for a particular time that is represented by the time tag in received message 240. Thus, the second satellite position is generated for the same time as the satellite position from which the encoded ambiguity value was derived. For purposes of clarity, this satellite position, which is determined locally at GNSS receiver 500, is referred to herein as a second satellite position. This second satellite position is in terms of x, y, and z coordinates like those of other satellite positions which have previously been described herein.

Orbit determiner 530 resolves a satellite position from the encoded ambiguity value and the second satellite position. This resolved satellite position is referred to herein as a third satellite position. This third satellite position is a recreated approximation of the satellite position from which the encoded ambiguity value in message 240 was derived. In one embodiment, orbit determiner 530 utilizes this third satellite position to determine information (such as synchronization) about an orbit which is associated with the satellite position from which the encoded ambiguity value was derived. This "associated orbit," is the orbit used at the GNSS base station in calculating information received with or corresponding to a time tag in received message 240.

For example, in one embodiment, when the broadcast orbits used in the creation of the encoded ambiguity value and in the creation of the third satellite position are synchronized, and if the same precision, rounding rules, and truncation rules are applied at both the GNSS receiver and the GNSS base station, then the third satellite position should be in agreement with the second satellite position. It is appreciated that in some embodiments position resolver 540 may take additional actions to resolve the third satellite position, such as adding or subtracting one or more pre-defined offsets or comparing multiple possible solutions to see which is best or most likely. Detailed examples are described below.

Delta determiner 550 determines a delta between the third satellite position and the second satellite position. When delta determiner 550 determines that there is a delta of zero, then it is known that the orbits used to generate the encoded ambiguity value and the second satellite position are synchronized. Delta determiner 550 then sends a signal to orbit determiner 530. The signal indicates that any refinement information associated with message 240 is approved for use in refining positioning and navigation data that is generated using the synchronized broadcast orbit. A signal indicating disapproval of the refinement information may be sent when the third satellite position and the second satellite position are not in agreement. However, in some situations, such as when the encoded ambiguity value has been extracted from a position generated with a precise satellite orbit, when the broadcast orbits are not in sync, or when an orbit is slightly damaged during the extraction of the ambiguity value, a non-zero delta is likely. When a non-zero delta between the second satellite position and the third satellite position occurs, it is provided to orbit nudger 560. In one embodiment, any delta (zero or non-zero) is provided to orbit nudger 560.

Orbit nudger 560 uses the delta between the second satellite position and the third satellite position to nudge the broadcast orbit in use at the GNSS receiver into synchronization with the orbit which was used in creation of the encoded ambiguity value. For example, in one embodiment orbit nudger 560 employs a technique involving linear algebra, which is well known in the field of satellite orbits, to utilize the delta for adjusting at least one parameter of the broadcast orbit in use at GNSS receiver 500. The at least one parameter is adjusted such that the broadcast orbit is nudged toward congruence with an orbit in use at the GNSS base station. This can include nudging toward congruence with the orbit used for determining the satellite position from which the encoded ambiguity value was derived. This can also include nudging toward congruence with a slightly damaged orbit used at the GNSS base station in calculating information received with or corresponding to a time tag in received message 240.

In some embodiments x, y, and z coordinates of a satellite position are encoded in three separate encoded ambiguity values and assembled into separate messages 240, while in other embodiments x, y, and z coordinates are encoded into three ambiguity values included with a single message 240. Thus, orbit nudger 560 may wait until three messages 240 are received so that orbit nudging can be performed using x, y, and z coordinate that are recreated from the three separate messages 240. It is appreciated, that in some embodiments, such as when x, y, and z coordinates are related to a GLONASS satellite, orbit nudging may be performed after only a single coordinate has been decoded and recreated. It is further appreciated that synchronization between a nudged broadcast orbit, and the orbit used to format message 240, may only last a short period of time, such as a few seconds or minutes. Thus, in some embodiment, such nudging is repeated each time a new message 240 is received (e.g., once per second or once every several seconds).

With reference now to FIG. 5B, a block diagram is shown of an example of a second example GNSS receiver which may be used in accordance with various embodiments described herein. In particular, FIG. 5B illustrates a block diagram of a GNSS receiver in the form of a general purpose GPS receiver 570 capable of demodulation of the L2 signal(s) received from one or more GPS satellites. A more detailed discussion of the function of a receiver such as GPS receiver 570 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GPS receiver 570 of FIG. 5B.

In FIG. 5B, received L1 and L2 signals are generated by at least one GPS satellite. Each GPS satellite generates different signal L1 and L2 signals and they are processed by different digital channel processors 592 which operate in the same way as one another. FIG. 5B shows GPS signals (L1=1575.42 MHz, L2=1227.60 MHz) entering GPS receiver 570 through a dual frequency antenna 505. Antenna 505 may be a magnetically mountable model commercially available from Trimble Navigation of Sunnyvale, Calif. Master oscillator 588 provides the reference oscillator which drives all other clocks in the system. Frequency synthesizer 578 takes the output of master oscillator 588 and generates important clock and local oscillator frequencies used throughout the system. For example, in one embodiment frequency synthesizer 578 generates several timing signals such as a 1st local oscillator signal LO1 at 1400 MHz, a 2nd local oscillator signal LO2 at 175 MHz, a (sampling clock) SCLK signal 25 MHz, and a MSEC (millisecond) signal used by the system as a measurement of local reference time.

A filter/LNA (Low Noise Amplifier) 574 performs filtering and low noise amplification of both L1 and L2 signals. The noise figure of GPS receiver 570 is dictated by the performance of the filter/LNA combination. The downconvertor 576 mixes both L1 and L2 signals in frequency down to approximately 175 MHz and outputs the analogue L1 and L2 signals into an IF (intermediate frequency) processor 30. IF processor 590 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 592 inputs the digitally sampled L1 and L2 inphase and quadrature signals. All digital channel processors 592 are typically are identical by design and typically operate on identical input samples. Each digital channel processor 592 is designed to digitally track the L1 and L2 signals produced by one satellite by tracking code and carrier signals and to from code and carrier phase measurements in conjunction with the microprocessor system 594. One digital channel processor 592 is capable of tracking one satellite in both L1 and L2 channels. Microprocessor system 594 is a general purpose computing device (such as computer system 100 of FIG. 1) which facilitates tracking and measurements processes, providing pseudorange and carrier phase measurements for a navigation processor 598. In one embodiment, microprocessor system 594 provides signals to control the operation of one or more digital channel processors 592. Navigation processor 598 performs the higher level function of combining measurements in such a way as to produce position, velocity and time information for the differential and surveying functions. Storage 599 is coupled with navigation processor 598 and microprocessor system 594. It is appreciated that storage 599 may comprise a volatile or non-volatile storage such as a RAM or ROM, or some other computer readable memory device or media. In one embodiment, some functions performed by navigation processor 598, including receiving and decoding position information sent from a GNSS base station and processing refinement information, are described by the components and functions shown and discussed in conjunction with FIG. 5A. In one embodiment, GNSS base station 200 also includes a GNSS receiver, such as GNSS receiver 500 or GPS receiver 570.

GNSS Receiver Example Methods of Operation

The above discussion has set forth the operation of some example systems, devices, and methods of operation of embodiments described herein. With reference to FIG. 6, flow diagram 600 describes example steps of a method that, in various embodiments, is carried out by a processor under the control of computer-readable and computer-executable instructions. Thus, in some embodiments, this method is implemented via a computer, such as computer system 100 of FIG. 1 which may be used to implement some of the functions and/or components of GNSS receiver 500 and/or receiver 570. The computer-readable and computer-executable instructions reside, for example, in data storage features such as computer usable/readable volatile memory 104, computer usable/readable non-volatile memory 106, or computer useable/readable media of storage device 118 of computer system 100 (all shown in FIG. 1). The computer-readable and computer-executable instructions, which may reside on computer useable/readable media, are used to control or operate in conjunction with, for example, processor 102 of FIG. 1. Although specific steps are disclosed in flow diagram 600, such steps are examples. That is, embodiments are well suited to performing various other steps or variations of the steps recited. It is appreciated that the steps in flow diagram 600 may be performed in an order different than presented, and that not all of the steps in flow diagram 600 may be performed.

Example Method of Synchronizing Orbits

FIG. 6 illustrates a flow diagram 600 of an example method of synchronizing orbits used at a GNSS receiver and a GNSS base station, in accordance with one embodiment. The operation of the method of flow diagram 600 is described with reference to components and functionality GNSS receiver 500 of FIG. 5, GNSS base station 200 of FIG. 2, and with reference to elements of the diagram of message creation shown in FIG. 4. It is appreciated that no IODE information is required to be utilized when synchronizing orbits using the method of flow diagram 600.

At 610 of flow diagram 600, in one embodiment, the method receives a message from a GNSS base station. The received message comprises a time tag and an encoded ambiguity value derived from a satellite position for a GNSS satellite. It is appreciated that the satellite position, from which the encoded ambiguity value was derived, has been calculated by the GNSS base station utilizing either a precise orbit or a broadcast orbit for the GNSS satellite and a time that is then represented in the message by the time tag. A precise orbit is an orbit which more exactly describes the orbit of the GNSS satellite that a contemporaneously valid broadcast orbit which is transmitted from the GNSS satellite. In either case, the orbit used in the calculations at the GNSS base station will be referred to herein as the first orbit. Similarly the satellite position generated from this first orbit is typically referred to herein as the first satellite position.

For example, in one embodiment, in calculating this first satellite position, GNSS base station 200 utilizes a first broadcast orbit received at GNSS base station 200 from the GNSS satellite and a time that is then represented in the message by the time tag. For example, in one embodiment, message 240A, including time tag 410 and encoded ambiguity value 405, is received by message receiver 510 of GNSS receiver 500 after being sent from GNSS base station 200. It is appreciated that message 240A may additionally comprise refinement information intended for use in refining positioning and navigation data determined by GNSS receiver 500.

Similarly, in another embodiment, in calculating the first satellite position, GNSS base station 200 utilizes a precise orbit for the GNSS satellite and a time that is represented in the received message by the time tag. For instance, a message 240 is derived from a precise orbit and includes a time tag and an encoded ambiguity value. This message 240 is received by message receiver 510 of GNSS receiver 500 after being sent from GNSS base station 200. It is appreciated that this message 240 may additionally comprise refinement information intended for use in refining positioning and navigation data determined by GNSS receiver 500.

In one embodiment, at 610 of flow diagram 600, GNSS receiver 500 receives a message in which the encoded ambiguity value in the message comprises a value derived from and representing an x, y, or z coordinate of a position of the GNSS satellite (the first satellite position) for the time represented by the time tag. For example, as illustrated by FIG. 4, encoded ambiguity value 405 of message 240A is derived from and represents an x-coordinate value of the position of GPS satellite 26 at a time represented by time tag 410.

After receipt, message receiver 510 provides all or part of message 240 to orbit processor 520 and to orbit determiner 530. For instance, in one embodiment, encoded ambiguity value 405 and time tag 410 are provided to orbit determiner 530 while refinement information and time tag 410 are provided to orbit processor 520.

At 620 of flow diagram 600, in one embodiment, the method calculates a second satellite position for the GNSS satellite. The second satellite position is calculated utilizing the time represented by the time tag and a broadcast orbit. The broadcast orbit is received at the GNSS receiver from the GNSS satellite. With reference to Example A (shown above), in one embodiment, orbit processor 520 of GNSS receiver 500 calculates this second satellite position using a time represented by time tag 410 of message 240A and a broadcast orbit received at GNSS receiver 500 via an over-the-air broadcast from the GPS satellite 26.

At 630 of flow diagram 600, in one embodiment, the method resolves a third satellite position for the GNSS satellite. The third satellite position is resolved utilizing the encoded ambiguity value and an ambiguous portion of most significant digits of the second satellite position. It is appreciated that the third satellite position comprises a recreated approximation of the first satellite position from which the encoded ambiguity value was extracted. In the most basic sense, the third satellite position is resolved by reversing the encoding process to decode an ambiguity value from encoded ambiguity value, and then combining the ambiguity value with an ambiguous portion of the second satellite position. It is also appreciated that in some embodiments, an offset, truncation of digits, and/or rounding may also be utilized in determining the third satellite position. In some embodiments, orbit determiner 530 relies upon position resolver 540 to resolve the third satellite position from the encoded ambiguity value and an ambiguous portion of the second satellite position.

With reference to FIG. 4 and Example A (shown above), in one embodiment, the third satellite position is resolved in the following manner. Orbit processor 520 generates the second satellite position from a broadcast orbit received from the GNSS satellite (GPS satellite 26 in this example), for a time represented by time tag 410. For purposes of example, it is assumed that this second satellite position has an x-coordinate value of −19,438,240.39562, which is provided to orbit determiner 530 and position resolver 540. Note that this x-coordinate value differs only slightly from the x-coordinate value of −19,438,237.5853 which was generated by GNSS base station 200. Position resolver 540 adds an offset of 100,000,000 meters to create a positive value, thus resulting in the positive value of 80,561,759.60438 meters. For consistency, this offsetting would be done even in cases where the x-coordinate was already positive. Thus, in one embodiment where a convention of offsetting is employed with negative numbers, the convention will be used to offset positive numbers as well. The value of 80,561,759.60438 is then divided by the size of the ambiguity window (32 meters) to get 2,517,554.98764 window units. The size of this ambiguity window may be a known default, a value that is independently calculable by GNSS receiver 500, or a value that is passed to GNSS receiver 500 as a portion of message 240A. This remainder is rounded both up and down to determine that the ambiguous portion of most significant digits of the satellite position is represented by the value of either 2,517,554 window units or 2,517,555 window units.

Position resolver 540 then decodes encoded ambiguity value 405 to achieve a value of 4 meters or 0.125 window units (4 divided by 32). A value of 0.125 window units is then added to each of the possible ambiguous portions. This results in values of 2,517,554.125 window units and 2,517,555.125 window units. An absolute difference is determined between each of these possibilities and the number of window units represented by the second satellite position (2,517,554.98764). 2,517,554.98764−2,517,554.125 generates an absolute difference of 0.86264 window units, which equates to 27.60448 meters. 2,517,554.98764−2,517,555.125 generates an absolute difference of 0.13736 window units, which equates to 4.39552 meters. The result which yields an absolute difference of 4.39552 meters is chosen, as this is within the +/−10 meter maximum satellite position determination margin of error of GNSS receiver 500, while the other result is outside of this margin of error.

Position resolver 540 combines (through addition) the ambiguity value (0.125) with the otherwise ambiguous portion of the second satellite position (2,517,555) to get a value of 2,517,555.125 window units. After converting these window units to meters by multiplying by the ambiguity window (32 meters) and subtracting the offset of 100,000,000 meters, position resolver 540 resolves an x-coordinate value of the third satellite position to be −19,438,236.0000 meters. This is a recreated approximation of the satellite position from which the encoded ambiguity value was derived (in this case, an x-coordinate value of −19,438,237.5853 meters). It is appreciated that this process can be similarly repeated for the y, and z coordinates of the satellite position. Encoded ambiguity values for the y and z coordinates can be included in the same message 240A as the information for the x-coordinate, or in one or more additional messages sent from GNSS base station 200.

With reference to Example B (shown above), in one embodiment, the third satellite position is resolved in the following manner. Orbit processor 520 generates the second satellite position from a broadcast orbit from the GNSS satellite (GPS satellite 26 in this example), for a time represented by the time tag included in the message. For purposes of example, it is assumed that this second satellite position has an x-coordinate value of −19,438,240.39562, which is provided to orbit determiner 530 and position resolver 540. Note that this x-coordinate value differs only slightly from the x-coordinate value of −19,438,237.5853 which was generated by GNSS base station 200 using a precise satellite orbit (per Example B). Position resolver 540 adds an offset of 100,000,000 meters to create a positive value, thus resulting in the positive value of 80,561,759.60438 meters. As in the previous example, for consistency, this offsetting (when employed) would be done even in cases where the x-coordinate was already positive. The value of 80,561,759.60438 is then divided by the size of the ambiguity window (32 meters) to get 2,517,554.98764 window units. The size of this ambiguity window may be a known default, a value that is independently calculable by GNSS receiver 500, or a value that is passed to GNSS receiver 500 as a portion of message 240. This remainder is rounded both up and down to determine that the ambiguous portion of most significant bits of the satellite position is represented by the value of either 2,517,554 window units or 2,517,555 window units.

Position resolver 540 then decodes the encoded ambiguity value to achieve an ambiguity value of 2.416 meters or 0.0755 window units (2.416 divided by 32). A value of 0.0755 window units is then added to each of the possible ambiguous portions. This results in values of 2,517,554.0755 window units and 2,517,555.0755 window units. An absolute difference is determined between each of these possibilities and the number of window units represented by the second satellite position (2,517,554.98764). 2,517,554.98764-2,517,554.0755 generates an absolute difference of 0.91924 window units, which equates to 29.18848 meters. 2,517,554.98764-2,517,555.0755 generates an absolute difference of 0.08786 window units, which equates to 2.81152 meters. The result which yields an absolute difference of 2.81152 meters is chosen, as this is within the +/−10 meter maximum satellite position determination margin of error of GNSS receiver 500, while the other result is outside of this margin of error.

Position resolver 540 combines (through addition) the ambiguity value (0.0755) with the ambiguous portion of the second satellite position (2,517,555) to get a value of 2,517,555.0755 window units. After converting these window units to meters by multiplying by the ambiguity window (32 meters) and subtracting the offset of 100,000,000 meters, position resolver 540 resolves an x-coordinate value of the third satellite position to be −19,438,237.584 meters. This is a recreated approximation of the satellite position from which the encoded ambiguity value was derived (in this case, an x-coordinate value of −19,438,237.5853 meters). It is appreciated that this process can be similarly repeated for the y, and z coordinates of the satellite position. Encoded ambiguity values for the y and z coordinates can be included in the same message 240 as the information for the x-coordinate, or in one or more additional messages 240 sent from GNSS base station 200.

At 640 of flow diagram 600, in one embodiment, the method determines that orbits used at GNSS base station 200 and at GNSS receiver 500 are synchronized when the third satellite position and the second satellite position are in agreement. In one embodiment, delta determiner 550 compares the second satellite position with the third satellite position. When the satellite positions agree (e.g., there is a delta value of zero) then this provides an indication that the orbit in use at GNSS receiver 500 is in sync with the orbit used by GNSS base station 200 to format the contents of message 240. When the second and third satellite positions exhibit a non-zero delta, rather than agreeing, then this provides an indication that the orbit in use at GNSS receiver 500 is not in sync with the orbit used by GNSS base station 200 to format the contents of message 240.

In one embodiment, in response to determining that the orbits used at the GNSS base station and the GNSS receiver are synchronized, the method also approves refinement information for use in refining positioning and navigation data calculated by the GNSS receiver. For example, in one embodiment, delta determiner 550 generates an indication such as a message or flag when a determination is made that the orbit in use at GNSS receiver 500 is in sync with the orbit used at GNSS base station 200 format content of message 240. This approval is supplied to orbit processor 520 and/or other portions of GNSS receiver 500. The approval confirms that refinement information received from GNSS base station 200 and associated with message 240 and/or the time tag of message 240 is approved as suitable for use with the broadcast orbit currently in use at GNSS receiver 500.

In one embodiment, when the approval is not issued, then the refinement information is not used. Instead the refinement information may be disposed, saved for a limited time period for possible use with an additional broadcast orbit which may have been in use previous to the current broadcast orbit or which may be about to be received from a GNSS satellite, or saved for use with a nudged broadcast orbit.

At 650 of flow diagram 600, in one embodiment, when the third satellite position and second satellite position are not in agreement, a nudging process is performed to achieve a nudged broadcast orbit. The nudged broadcast orbit is synchronized with an orbit in use at the GNSS base station from which message 240 was received. By being synchronized, what is meant is that the nudged orbit is in essential agreement with the orbit in use at the GNSS base station over at least a short term (e.g., a few seconds to several minutes).

For example, in one embodiment, the broadcast orbit in use at GNSS receiver 500 is nudged into synchronization with the first orbit. The nudging is performed by utilizing a delta or deltas between the second satellite position and third satellite position to nudge the broadcast orbit in use by the GNSS receiver toward agreement with the first orbit. This results in a nudged broadcast orbit at GNSS receiver 500 that is in essential agreement with the first orbit for at least a short period of time, such as several seconds or minutes. The nudging creates a nudged broadcast orbit, at GNSS receiver 500, which is substantially congruent with, and thus synchronized with, the first orbit used, which was used in generating the content of message 240. When, for example, GNSS receiver 500 uses an orbit that is synchronized with the orbit is in use at GNSS base station 200, techniques of common mode error rejection can be employed to reduce and/or eliminate common errors.

It is appreciated that in some instances a base station, such as GNSS base station 200, damages a first orbit in use at the base station, such as through rounding, truncation, or other manipulation of a positional coordinate when extracting the ambiguity value. In one embodiment, when such damage occurs, GNSS base station 200 uses the slightly damaged first orbit in performing calculations on refinement information shared with a GNSS receiver in association with a particular time tag and ambiguity value. This is done because it is known that a GNSS receiver, such as GNSS receiver 500, will only be able to use the ambiguity value to reproduce the satellite positional coordinates associated with the slightly damaged orbit. Thus, in some embodiments, when the nudging is performed, the nudging creates a nudged broadcast orbit, at GNSS receiver 500, which is substantially congruent with, and thus synchronized with, the slightly damaged first orbit used, which was used in generating the content of message 240. When this occurs, it is transparent to GNSS receiver 500. Because received refinement information which required use of an orbit, has been calculated using the slightly damaged first orbit, techniques of common mode error rejection can be employed to reduce and/or eliminate common errors.

This nudging technique works whether the first orbit was a broadcast orbit or a precise orbit. As described above, this nudging technique also works when the first orbit is slightly damaged. For example, in a case where the first orbit is a broadcast orbit, the nudging will nudge a broadcast orbit in use at GNSS receiver 500 toward congruence with the broadcast orbit used at the GNSS base station. This will bring the broadcast orbits into synchronization (for at least a short period of time). Similarly, in a case wherein the first orbit is a precise orbit, the nudging will nudge the broadcast orbit in use at GNSS receiver 500 toward congruence with the precise orbit. This will bring the broadcast orbit into synchronization with precise orbit (for at least a short period of time). After nudging, the nudged broadcast orbit is then used in calculating positioning and navigation data that are calculated by GNSS receiver 500. For example, in one embodiment, a signal is sent from orbit nudger 560, to indicate that refinement information received from a GNSS base station and associated with the time tag of message 240 is approved for use with the nudged broadcast orbit.

It is appreciated that in some embodiments, an encoded ambiguity value in a message may include information regarding a single x, y, or z coordinate of a satellite position. Thus the delta may only be the delta for the x, y, or z coordinate of the satellite position. In one embodiment, such as for example with GLONASS satellite, orbit nudger 560 uses a delta for a single x, y, or z position to nudge a parameter of the broadcast orbit being used by GNSS receiver 500. However in another embodiment, orbit nudger 560 accumulates deltas for the x, y, and z coordinates of the satellite position and uses the three deltas for nudging one or more parameters of the broadcast orbit in use by GNSS receiver 500.

In one embodiment, orbit nudger 560 employs a well known linear algebra technique (solving for unknowns) to determine an adjustment to a parameter of the broadcast orbit such that the broadcast orbit is nudged toward congruence with the first orbit (whether it is a precise orbit or a broadcast orbit). This comprises determining not only the amount of an adjustment to make, but in some instance, which parameter(s) to adjust. In an instance where deltas are known for x, y, and z coordinates of the satellite position, three unknowns can be solved for. Thus, three parameters of the broadcast orbit can be adjusted. In one embodiment, the three parameters to be adjusted are chosen so that they will have a desired impact of causing the broadcast orbit to become congruent with the precise orbit over a short term (e.g., several seconds to several minutes).

In one embodiment, when the absolute value of the z-coordinate of the third satellite position is greater than one earth radius (an earth radius being approximately 6,378,000 meters) the linear algebra technique is utilized to determine adjustments to broadcast orbit parameters roota, $M_0$, and $I_0$, as in this situation these three parameters will have the desired impact on synchronizing the broadcast orbit with the first orbit. Similarly, when the absolute value of the z-coordinate of the third satellite position is not greater than one earth radius, the linear algebra technique is utilized to determine adjustments to broadcast orbit parameters roota, $M_0$, and $\Omega_0$, as in this situation these three parameters will have the desired impact on synchronizing broadcast orbit with the first orbit. Put differently, a GNSS satellite will cross the equator at an angle and then move past the pole of the earth. The z-coordinate of a position of the GNSS satellite relates to how "high" off the equator that GNSS satellite is. Thus, when a GNSS satellite is between the equator and a pole (south or north pole) during its orbit, an absolute value of a z-coordinate of any position of the GNSS satellite will be less than or equal to one earth radius. In such a situation, a first set of actions is used to adjust broadcast orbit parameters. Conversely, when a GNSS satellite is not between the equator and a pole during its orbit, an absolute value of a z-coordinate of any position of the GNSS satellite will be greater than one Earth radius. In such a situation, a second (different) set of actions is used to adjust broadcast orbit parameters.

Embodiments of the subject matter are thus described. While the subject matter has been described in particular embodiments, it should be appreciated that the subject matter should not be construed as limited by such embodiments, but rather construed according to the following claims.

What is claimed is:

1. A method of conveying information regarding an orbit used at a Global Navigation Satellite System (GNSS) base station to a GNSS receiver, said method comprising:
    determining a satellite position for a particular time from an orbit of a GNSS satellite;
    extracting an ambiguity value from said satellite position, said extracting based upon a satellite position determination margin of error of a GNSS receiver;
    encoding said ambiguity value into an encoded ambiguity value;
    assembling a message including said encoded ambiguity value and a time tag representing said time; and
    transmitting said message from said GNSS base station, whereby said encoded ambiguity value and said time tag convey information regarding said orbit to a GNSS receiver in receipt of said message.

2. The method as recited in claim 1, wherein said resolving an ambiguity value from said satellite position further comprises:
    resolving an ambiguity window at least as large as a maximum satellite position determination margin of error of said GNSS receiver; and
    using said ambiguity window to resolve said ambiguity value.

3. The method as recited in claim 2, further comprising:
    including an additional margin of safety in said ambiguity window such that said ambiguity window is larger than a maximum satellite position determination margin of error of said GNSS receiver.

4. The method as recited in claim 1, wherein said encoding said ambiguity value into an encoded ambiguity comprises:
    encoding said ambiguity value into said encoded ambiguity value such that a recipient GNSS receiver is enabled to recreate an approximation of a coordinate of said satellite position by combining a decoded ambiguity value and an ambiguous portion of a second satellite position generated locally at said GNSS receiver.

5. The method as recited in claim 1, wherein said encoding said ambiguity value into an encoded ambiguity value comprises:
    encoding information derived from an x, y, or z coordinate of said satellite position into said encoded ambiguity value.

6. The method as recited in claim 1, wherein said assembling a message including said encoded ambiguity value and a time tag representing said time further comprises:
    assembling said message to include refinement information, said refinement information for use in refining positioning and navigation data calculated by a recipient of said message.

7. The method as recited in claim 1, wherein said assembling a message including said encoded ambiguity value and a time tag representing said time further comprises:
    assembling said message to include descriptive information regarding said encoded ambiguity value.

8. A Global Navigation Satellite System (GNSS) base station comprising:
    an orbit processor configured for executing a GNSS orbit algorithm in association with an orbit of a GNSS satellite and a time, such that a satellite position is determined for said time;
    an ambiguity value extractor configured for extracting an ambiguity value from said satellite position based upon a satellite position determination margin of error of a GNSS receiver;

an ambiguity value encoder configured for encoding said ambiguity value as an encoded ambiguity value; and
a message assembler configured for assembling a message comprising said encoded ambiguity value and a time tag representing said time.

9. The GNSS bases station of claim 8, wherein said ambiguity value extractor is configured for extracting said ambiguity value using an ambiguity window at least as large as a maximum satellite position determination margin of error a GNSS receiver intended to receive said message.

10. The GNSS base station of claim 8, wherein said message assembler is further configured for assembling said message to include refinement information generated by said GNSS base station, said refinement information for use in refining positioning and navigation data calculated by said GNSS receiver.

11. The GNSS base station of claim 10, wherein:
said refinement information is selected from the group of refinement information consisting of: correctors and raw measurable information.

12. A method of synchronizing orbits used at a Global Navigation Satellite System (GNSS) receiver and at a GNSS base station, said method comprising:
receiving a message from said GNSS base station, said message comprising a time tag and an encoded ambiguity value derived from a satellite position of a GNSS satellite, said satellite position calculated by said GNSS base station utilizing a first orbit for said GNSS satellite and a time represented by said time tag;
calculating a second satellite position for said GNSS satellite utilizing said time represented by said time tag and a broadcast orbit received at said GNSS receiver from said GNSS satellite;
resolving a third satellite position for said GNSS satellite using said encoded ambiguity value and an ambiguous portion of said second satellite position; and
determining that orbits used at said GNSS base station and said GNSS receiver are synchronized when said third satellite position and said second satellite position are in agreement.

13. The method as recited in claim 12, wherein said receiving a message from said GNSS base station comprises:
receiving said message, wherein said encoded ambiguity value comprises a value derived from and representing a portion of a coordinate of said satellite position.

14. The method as recited in claim 12, wherein determining that orbits used at said GNSS base station and said GNSS receiver are synchronized when said third satellite position and said second satellite position are in agreement further comprises:
approving refinement information for use in refining positioning and navigation data calculated by said GNSS receiver, said refinement information received from said GNSS base station and associated with said time tag.

15. The method as recited in claim 12, further comprising:
when said second satellite position and said third satellite position are not in agreement, performing a nudging process on said broadcast orbit to achieve a nudged broadcast orbit.

16. The method as recited in claim 15, wherein performing a nudging process on said broadcast orbit to achieve a nudged broadcast orbit comprises:
nudging said broadcast orbit into synchronization with said first orbit.

17. The method as recited in claim 15, wherein performing a nudging process on said broadcast orbit to achieve a nudged broadcast orbit comprises:
nudging said broadcast orbit into synchronization with a slightly damaged version of said first orbit.

18. The method as recited in claim 15, wherein said performing a nudging process on said broadcast orbit to achieve a nudged broadcast orbit further comprises:
using said nudged broadcast orbit in calculating positioning and navigation data calculated by said GNSS receiver.

19. The method as recited in claim 18, wherein said using said nudged broadcast orbit in calculating positioning and navigation data calculated by said GNSS receiver further comprises:
approving refinement information for use in refining said positioning and navigation data calculated by said GNSS receiver, said refinement information received from said GNSS base station and associated with said time tag.

20. The method as recited in claim 15, wherein said nudging said broadcast orbit into synchronization with said first orbit comprises:
employing a linear algebra technique to determine an adjustment to a parameter of said broadcast orbit.

21. The method as recited in claim 20, wherein said employing a linear algebra technique to determine an adjustment to a parameter of said broadcast orbit comprises:
utilizing said linear algebra technique to determine adjustments to broadcast orbit parameters root$a$, $M_0$, and $I_0$ when an absolute value of a z-coordinate of said third satellite position is greater than one earth radius; and
utilizing said linear algebra technique to determine adjustments to broadcast orbit parameters root$a$, $M_0$, and $\Omega_0$ when said absolute value of said z-coordinate of said third satellite position is not greater than one earth radius.

22. A Global Navigation Satellite System (GNSS) receiver comprising:
a message receiver configured for receiving a message broadcast from a GNSS base station, said message comprising a time tag associated with a satellite position and an encoded ambiguity value derived from said satellite position;
an orbit processor configured for utilizing a broadcast orbit from said GNSS satellite to determine a second satellite position of said GNSS satellite, said satellite position and said second satellite position both being for a time represented by said time tag; and
an orbit determiner configured for resolving a third satellite position from said encoded ambiguity value and said second satellite position, said third satellite position comprising an approximation of said satellite position.

23. The GNSS receiver of claim 22, wherein said orbit determiner further comprises:
a position resolver configured for resolving said third satellite position from said encoded ambiguity value and an ambiguous portion of said second satellite position.

24. The GNSS receiver of claim 22, wherein said orbit determiner further comprises:
a delta determiner for determining a delta between said third satellite position and said second satellite position.

25. The GNSS receiver of claim 24, wherein said orbit determiner further comprises:
an orbit nudger configured for adjusting a parameter of said broadcast orbit, such that said broadcast orbit is nudged toward congruence with an orbit utilized in said GNSS base station.

* * * * *